United States Patent
Sohn et al.

(10) Patent No.: US 11,383,221 B2
(45) Date of Patent: Jul. 12, 2022

(54) PREPARATION METHOD OF SUPER ABSORBENT POLYMER

(71) Applicant: LG Chem, Ltd., Seoul (KR)

(72) Inventors: Jungmin Sohn, Daejeon (KR); Tae Young Won, Daejeon (KR); Hyemin Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/049,757

(22) PCT Filed: Nov. 18, 2019

(86) PCT No.: PCT/KR2019/015776
§ 371 (c)(1),
(2) Date: Oct. 22, 2020

(87) PCT Pub. No.: WO2020/122444
PCT Pub. Date: Jun. 18, 2020

(65) Prior Publication Data
US 2021/0229070 A1    Jul. 29, 2021

(30) Foreign Application Priority Data
Dec. 12, 2018 (KR) .......... 10-2018-0160284

(51) Int. Cl.
| | | |
|---|---|---|
| *B01J 20/04* | (2006.01) | |
| *B01J 20/26* | (2006.01) | |
| *B01J 20/30* | (2006.01) | |
| *C08F 220/06* | (2006.01) | |

(52) U.S. Cl.
CPC ......... *B01J 20/267* (2013.01); *B01J 20/3021* (2013.01); *B01J 20/3085* (2013.01); *C08F 220/06* (2013.01); *C08F 2800/20* (2013.01); *C08F 2810/20* (2013.01)

(58) Field of Classification Search
CPC ....... B01J 20/04; B01J 20/267; B01J 20/3085
See application file for complete search history.

(56) References Cited

U.S. PATENT DOCUMENTS

| | | | |
|---|---|---|---|
| 5,981,070 A | 11/1999 | Ishizaki et al. | |
| 2004/0071966 A1 | 4/2004 | Inger et al. | |
| 2009/0318582 A1 | 12/2009 | Loesch et al. | |
| 2010/0072421 A1 | 3/2010 | Kitano et al. | |
| 2011/0180755 A1 | 7/2011 | Adachi et al. | |
| 2012/0184684 A1 | 7/2012 | Funk et al. | |
| 2012/0296297 A1 | 11/2012 | Di Cintio et al. | |
| 2013/0256593 A1* | 10/2013 | Herfert ......... | B01J 20/267 502/402 |
| 2015/0119531 A1 | 4/2015 | Bauduin et al. | |
| 2015/0258237 A1 | 9/2015 | Machida et al. | |
| 2016/0280866 A1 | 9/2016 | Lee et al. | |
| 2016/0375171 A1* | 12/2016 | Omori ......... | A61L 15/60 525/329.7 |
| 2018/0001300 A1* | 1/2018 | Nakatsuru ......... | B01J 20/30 |
| 2018/0237594 A1 | 8/2018 | Lee et al. | |
| 2018/0265645 A1 | 9/2018 | Nam et al. | |
| 2018/0305503 A1 | 10/2018 | Lim et al. | |

FOREIGN PATENT DOCUMENTS

| | | |
|---|---|---|
| EP | 0780424 A1 | 6/1997 |
| EP | 1462473 A1 | 9/2004 |
| EP | 2163302 A1 | 3/2010 |
| EP | 2404954 A1 | 1/2012 |
| JP | S59086657 A | 5/1984 |
| JP | S63063723 A | 3/1988 |
| JP | H04119154 A | 4/1992 |
| JP | H06298841 A | 10/1994 |
| JP | H09239912 A | 9/1997 |
| JP | 2001258934 A | 9/2001 |
| JP | 2002284882 A | 10/2002 |
| JP | 2004285202 A | 10/2004 |
| JP | 2004300425 A | 10/2004 |
| JP | 4163538 B2 | 10/2008 |
| JP | 2009543921 A | 12/2009 |
| JP | 2010017536 A | 1/2010 |
| JP | 2013507466 A | 3/2013 |
| JP | 5558096 B2 | 7/2014 |

(Continued)

OTHER PUBLICATIONS

Search Report from Japanese Application No. 2020-542558 dated Aug. 16, 2021.7 pgs.
Third Party Observation for PCT/KR2019/015776 submitted Mar. 30, 2021.
International Search Report for Application No. PCT/KR2019/015776 dated Mar. 3, 2020, 2 pages.
Odian, Principles of Polymerization, Second Edition, Copyright 1981 by John Wiley & Sons, Inc, p. 203.
Schwalm, UV Coatings; Basics, Recent Developments and New Applications, Dec. 21, 2006, p. 115, Elsevier Science.

*Primary Examiner* — Robert C Boyle
(74) *Attorney, Agent, or Firm* — Lerner, David, Littenberg, Krumholz & Mentlik, LLP

(57) ABSTRACT

The present disclosure relates to a preparation method of a super absorbent polymer capable of improving absorption performance of the super absorbent polymer by adding a simple additive later. The preparation method includes the steps of: forming a hydrogel polymer by cross-linking and polymerizing a water-soluble ethylene-based unsaturated monomer having at least partially neutralized acidic groups in the presence of an internal cross-linking agent; drying, pulverizing and classifying the hydrogel polymer to form a base resin powder; forming a surface cross-linked layer by further cross-linking a surface of the base resin powder in the presence of a surface cross-linking agent, adding a monovalent to trivalent metal cation on the surface cross-linked base resin powder at a temperature of 25° C. to 80° C., and maintaining and aging the resulting metal cation-added product at a temperature of 40° C. to 60° C. for 10 to 30 minutes.

12 Claims, No Drawings

(56) References Cited

FOREIGN PATENT DOCUMENTS

| | | |
|---|---|---|
| JP | 2015001402 A | 1/2015 |
| JP | 5785087 B2 | 9/2015 |
| JP | 5996664 B2 | 9/2016 |
| JP | 2017026621 A | 2/2017 |
| JP | 2018127508 A | 8/2018 |
| KR | 20110111938 A | 10/2011 |
| KR | 20130138851 A | 12/2013 |
| KR | 20140133470 A | 11/2014 |
| KR | 20160148986 A | 12/2016 |
| KR | 20170053415 A | 5/2017 |
| KR | 20170103849 A | 9/2017 |
| KR | 20170106154 A | 9/2017 |
| WO | 1997003114 A1 | 1/1997 |
| WO | 2006088115 A1 | 8/2006 |
| WO | 2008110524 A1 | 9/2008 |
| WO | 2009041727 A1 | 4/2009 |
| WO | 2011040530 A1 | 4/2011 |

* cited by examiner

PREPARATION METHOD OF SUPER ABSORBENT POLYMER

CROSS-REFERENCE TO RELATED APPLICATIONS

The present application is a national phase entry under 35 U.S.C. § 371 of International Application No. PCT/KR2019/015776, filed Nov. 18, 2019, which claims priority to Korean Patent Application No. 10-2018-0160284, filed on Dec. 12, 2018, the disclosures of which are incorporated herein by reference in their entirety.

TECHNICAL FIELD

The present disclosure relates to a preparation method of a super absorbent polymer capable of improving absorption performance of the super absorbent polymer by adding a simple additive later.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or the like.

In most cases, these super absorbent polymers have been widely used in the field of hygienic materials such as diapers or sanitary napkins. For these applications, the super absorbent polymer should exhibit high moisture absorbency, it should not release the absorbed water even in the external pressure, and additionally it should well retain the shape even in a state where the volume is expanded (swelled) by absorbing water, thereby exhibiting excellent liquid permeability.

In recent years, as the demand for a thin diaper increases, the content of fibrous materials such as pulp in the diaper decreases, and the proportion of the super absorbent polymer in the diaper tends to increase. Therefore, the super absorbent polymer needs to have the performance of the fibrous material of the diaper. For this, the super absorbent polymer should have high absorbency as well as a high absorption rate and liquid permeability.

Meanwhile, in order for the super absorbent polymer to exhibit the above-described high liquid permeability, it is basically necessary to keep the shape even after the super absorbent polymer particles absorb moisture and swell to maintain voids between the particles. This is because the voids between the particles act as a flow path, so that excellent liquid permeability of the super absorbent polymer can be ensured. For this reason, in order to provide a super absorbent polymer exhibiting improved liquid permeability and other excellent physical properties, it is necessary to manufacture such super absorbent polymer so as to exhibit higher gel strength by surface cross-linking or the like.

Therefore, in order to increase the gel strength of the super absorbent polymer and improve the liquid permeability, it is necessary to perform surface cross-linking at a relatively high temperature to make a surface cross-linking density more dense.

However, when the gel strength is improved by densifying the surface cross-linking density as described above, the super absorbent polymer is difficult to absorb and retain moisture, so that the basic absorption performance of the super absorbent polymer such as water retention capacity and absorbency under pressure is deteriorated.

As a result, there is a continuing need for developing a preparation method capable of further improving absorption performance of a super absorbent polymer while increasing gel strength of the super absorbent polymer.

DETAILED DESCRIPTION OF THE INVENTION

Technical Problem

In the present disclosure, there is provided a preparation method of a super absorbent polymer capable of improving absorption performance of the super absorbent by adding a simple additive later.

Technical Solution

In the present disclosure, there is provided a preparation method of a super absorbent polymer, including the steps of:

forming a hydrogel polymer by cross-linking and polymerizing a water-soluble ethylene-based unsaturated monomer having at least partially neutralized acidic groups in the presence of an internal cross-linking agent;

drying, pulverizing and classifying the hydrogel polymer to form a base resin powder;

forming a surface cross-linked layer by further cross-linking a surface of the base resin powder in the presence of a surface cross-linking agent, adding a monovalent to trivalent metal cation on the surface cross-linked base resin powder at a temperature of 25° C. to 80° C., and maintaining and aging the resulting metal cation-added product at a temperature of 40° C. to 60° C. for 10 to 30 minutes.

Hereinafter, a preparation method of a super absorbent polymer according to specific embodiments of the present invention will be described in detail. However, this is merely presented as an example of the present invention, and will be apparent to those skilled in the art that the scope of the present invention is not limited to these embodiments, and various modifications can be made to the embodiments within the scope of the present invention.

In addition, unless stated otherwise throughout this specification, the term "comprise" "include" or "contain" refers to including any constituent element (or constituent component) without particular limitation, and it cannot be interpreted as a meaning of excluding an addition of other constituent element (or constituent component).

According to one embodiment of the present disclosure, there is provided a preparation method of a super absorbent polymer, including the steps of:

forming a hydrogel polymer by cross-linking and polymerizing a water-soluble ethylene-based unsaturated monomer having at least partially neutralized acidic groups in the presence of an internal cross-linking agent;

drying, pulverizing and classifying the hydrogel polymer to form a base resin powder;

forming a surface cross-linked layer by further cross-linking a surface of the base resin powder in the presence of a surface cross-linking agent, adding a monovalent to trivalent metal cation on the surface cross-linked base resin powder at a temperature of 25° C. to 80° C., and maintaining and aging the resulting metal cation-added product at a temperature of 40° C. to 60° C. for 10 to 30 minutes.

In this method, after surface cross-linking for preparing a super absorbent polymer, a predetermined metal cation is added to the surface cross-linked resin, and the metal cation-added resin is aged at a predetermined temperature for a predetermined time. As a result of experiments conducted by the present inventors, it has been confirmed that when the metal cation is added and subjected to an aging process under predetermined conditions, it is possible to further improve absorption performance such as water retention capacity and absorbency under pressure of the super absorbent polymer. This is expected to be due to the following reasons.

It seems that the metal cation added on the surface cross-linked resin can deprotonate a hydrogen of a carboxyl group (—COOH) present on the surface of the surface cross-linked resin, thereby ionizing the carboxyl group in the form of an ionic functional group of —COO—. In particular, when optimizing the temperature and time conditions of the metal cation addition step and the aging step, the degree of ionization may become higher, and additional surface cross-linking can be suppressed in the metal cation addition step and the aging step.

As a result, a plurality of —COO— ionic functional groups exist on the super absorbent polymer, and conversely, a surface cross-linking density achieved in the previous surface cross-linking step can be maintained at an equal level. Therefore, the super absorbent polymer finally prepared can have high affinity with water molecules due to the ionic functional group, and thus the super absorbent polymer obtained according to the method of one embodiment may exhibit further improved absorption performance such as water retention capacity and absorbency under pressure, while maintaining excellent gel strength and liquid permeability achieved in the previous surface cross-linking step.

Therefore, the method of one embodiment can prepare a super absorbent polymer exhibiting further improved absorption performance with excellent liquid permeability.

Hereinafter, a preparation method of one embodiment and a super absorbent polymer obtained therefrom will be described in more detail in each step.

First, in the preparation method of the embodiment, the water-soluble ethylene-based unsaturated monomer may be any monomer commonly used in the preparation of a super absorbent polymer. As a non-limiting example, the water-soluble ethylene-based unsaturated monomer may be a compound represented by the following Chemical Formula 1:

  [Chemical Formula 1]

in Chemical Formula 1, $R_1$ is a C2 to C5 alkyl group having an unsaturated bond, and $M^1$ is a hydrogen atom, a monovalent or divalent metal, an ammonium group, or an organic amine salt.

Preferably, the monomer may be at least one selected from the group consisting of (meth)acrylic acid, and a monovalent (alkali)metal salt, a divalent metal salt, an ammonium salt and an organic amine salt of the (meth) acrylic acid. When (meth)acrylic acid and/or a salt thereof is used as the water-soluble ethylene-based unsaturated monomer, it is advantageous to obtain a super absorbent polymer with improved absorbency. In addition, an anionic monomer of maleic anhydride, fumalic acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, or a salt thereof; a nonionic hydrophilic monomer of (meth) acrylamide, N-substituted (meth)acrylate, 2-hydroxyethyl (meth)acrylate, 2-hydroxypropyl(meth)acrylate, methoxypolyethyleneglycol(meth)acrylate, or polyethyleneglycol (meth)acrylate; or an amino-containing unsaturated monomer of (N,N)-dimethylaminoethyl(meth)acrylate or (N,N)-dimethylaminopropyl(meth)acrylamid, or a quaternary compound thereof may be used as the monomer.

Herein, the water-soluble ethylene-based unsaturated monomer may be those having acidic groups which are at least partially neutralized. Preferably, the monomers may be those partially neutralized with an alkali substance such as sodium hydroxide, potassium hydroxide, ammonium hydroxide, or the like.

In this regard, a degree of neutralization of the monomer may be 55 to 95 mol %, 60 to 80 mol %, or 65 to 75 mol %. The degree of neutralization may vary depending on the final properties, but an excessively high degree of neutralization precipitates the neutralized monomers, and thus polymerization may not readily occur. On the contrary, an excessively low degree of neutralization not only deteriorates the absorbency of the polymer, but also endows the polymer with hard-to-handle properties, such as those of an elastic rubber.

In the first step of the method of one embodiment, a monomer composition including a water-soluble ethylene-based unsaturated monomer having at least partially neutralized acidic groups may be cross-linked and polymerized in the presence of an internal cross-linking agent.

At this time, the water-soluble ethylene-based unsaturated monomer is as described above. In addition, the concentration of the water-soluble ethylene-based unsaturated monomer in the monomer composition may be appropriately adjusted in consideration of polymerization time and reaction conditions, and may preferably be 20 to 90 wt %, or 40 to 65 wt %. This concentration range may be advantageous for controlling a pulverizing efficiency during pulverization of a polymer, which will be described later, while eliminating the need to remove unreacted monomers after polymerization using a gel effect phenomenon that occurs in the polymerization reaction of a high concentration aqueous solution. However, when the concentration of the monomer is excessively low, the yield of the super absorbent polymer may become low. On the contrary, when the concentration of the monomer is excessively high, there is a process problem that a part of the monomers is precipitated, or a pulverizing efficiency is lowered upon pulverization of the polymerized hydrogel polymer, and physical properties of the super absorbent polymer may be deteriorated.

As the internal cross-linking agent, any compound can be used as long as it allows introduction of cross-linking during polymerization of the water-soluble ethylene-based unsaturated monomer. For example, as the internal cross-linking agent, a polyfunctional cross-linking agent such as N,N'-methylenebisacrylamide, tri methylolpropane tri(meth)acrylate, ethyleneglycol di(meth)acrylate, polyethyleneglycol di(meth)acrylate, propyleneglycol di(meth)acrylate, polypropyleneglycol (meth)acrylate, butanediol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, propylene glycol, or glycerin may be used alone or in combination of two or more, but is not limited thereto.

The internal cross-linking agent may be added in an amount of 0.001 to 1 parts by weight, or 0.005 to 0.7 parts by weight based on 100 parts by weight of the unsaturated monomer. When the content of the internal cross-linking agent is too low, gel strength and/or liquid permeability of the polymer may not be sufficient. Conversely, when the content of the internal cross-linking agent is too high, basic absorption performance of the polymer such as water retention capacity may not be sufficient.

Meanwhile, the monomer composition, for example, the aqueous monomer solution, may further include one or more additives selected from the group consisting of a blowing agent, a surfactant, a polyvalent metal salt, a photoinitiator, a thermal initiator and a polyalkylene glycol-based polymer, in addition to the above-mentioned monomer and internal cross-linking agent.

These additives are used to further improve physical properties of a super absorbent polymer by further improving liquid permeability of the super absorbent polymer (polyvalent metal salts, polyalkylene glycol-based polymers, etc.), improving an absorption rate (blowing agents, surfactants, etc.), or facilitating cross-linking polymerization (photoinitiators, thermal initiators, etc).

These additives may be used in an amount of 2000 ppmw or less, 0 to 2000 ppmw, 10 to 1000 ppmw, or 50 to 500 ppmw based on 100 parts by weight of the monomer depending on the respective roles. As a result, physical properties such as liquid permeability or an absorption rate of the super absorbent polymer can be further improved.

Among the above-mentioned additives, polyethylene glycol or polypropylene glycol may be used as the polyalkylene glycol-based polymer.

In addition, a polymerization initiator that has been generally used for preparing a super absorbent polymer can be used without particular limitations as the photo (polymerization) initiator and/or the thermal (polymerization) initiator. Particularly, even when the photopolymerization method is applied thereto, a certain amount heat is generated by UV radiation and the like, and some heat occurs as the polymerization reaction, an exothermal reaction, progresses. Therefore, a photo (polymerization) initiator and/or a thermal (polymerization) initiator can be used together to prepare a super absorbent polymer having better absorption rate and properties.

Furthermore, as the thermal (polymerization) initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4$)$_2S_2O_8$), and the like may be used as examples of the persulfate-based initiators. In addition, 2,2-azobis-(2-amidinopropane)dihydrochloride, 2,2-azobis-(N,N-dimethylene)isobutyramidinedihydrochloride, 2-(carbamoylazo)isobutylonitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, which can be referred to.

For example, the photo (polymerization) initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. As the specific example of acyl phosphine, commercial lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, which can be referred to.

The initiator may be added in an amount of 500 ppmw or less based on 100 parts by weight of the monomer. When the concentration of the polymerization initiator is excessively low, the polymerization rate becomes slow, and residual monomers may be extracted in a large amount from the final product. Conversely, when the concentration of the polymerization initiator is higher than the above range, polymer chains forming a network are shortened, so that the content of extractable components increases and absorbency under pressure decreases, thereby lowering physical properties of the polymer.

Meanwhile, the monomer composition may further include a thickener, a plasticizer, a preservation stabilizer, an antioxidant, or the like, if necessary.

The monomer composition may be prepared in the form of a solution in which the raw materials such as the above-described monomer are dissolved in a solvent. At this time, any solvent which can dissolve the raw materials may be used without limitation. For example, water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, or a mixture thereof may be used.

In addition, the monomer composition in the form of an aqueous solution, or the like may be controlled such that an initial temperature is 30 to 60° C., and light energy or thermal energy may be applied thereto for cross-linking polymerization.

The formation of a hydrogel polymer by cross-linking and polymerizing the monomer composition may be performed by a conventional polymerization method, and the process is not particularly limited. For example, the polymerization method is largely divided into thermal polymerization and photopolymerization according to an energy source of the polymerization. In the case of thermal polymerization, it is generally carried out in a reactor having an agitation spindle, such as a kneader. In the case of photopolymerization, it may be carried out in a reactor equipped with a movable conveyor belt.

For example, a hydrogel polymer can be obtained by introducing the monomer composition into a reactor equipped with an agitation spindle such as a kneader, and supplying hot air or heating the reactor to perform thermal polymerization. At this time, the hydrogel polymer may be discharged to a reactor outlet in the form of several centimeters to several millimeters particles depending on a shape of the agitation spindle provided in the reactor. Specifically, the hydrogel polymer may be obtained in various forms depending on the concentration and injection rate of the monomer composition to be injected, and a hydrogel polymer having a (weight average) particle diameter of 2 to 50 mm may be usually obtained.

In addition, when photopolymerization of the monomer composition is performed in the reactor equipped with a movable conveyor belt, a hydrogel polymer in the form of a sheet may be obtained. At this time, a thickness of the sheet may vary depending on the concentration and injection rate of the monomer composition to be injected, and it is preferable to adjust the thickness to 0.5 to 5 cm in order to allow the entire sheet to be polymerized evenly for ensuring a production speed, and the like.

Generally, the moisture content of the hydrogel polymer obtained by the above method may be 40 to 80 wt. Meanwhile, "moisture content" in the present description is the content of moisture in the entire weight of the hydrogel polymer, and it means a value of which the weight of the dried polymer is subtracted from the weight of the hydrogel polymer. Specifically, the moisture content is defined as a value calculated from the weight loss due to moisture evaporation from the polymer in the process of increasing the temperature of the polymer and drying the same through infrared heating. At this time, the drying condition for measuring the moisture content is that the temperature is increased to 180° C. and maintained at 180° C., and the total drying time is 20 min including 5 min of a heating step.

After preparing the hydrogel polymer by the above-described method, the hydrogel polymer may be gel-pulverized to form a hydrogel polymer having a small average particle diameter. In the gel-pulverization step, the hydrogel polymer may be pulverized to have a particle diameter of 10 mm or less, 5 mm or less, or 1.0 mm to 2.0 mm. The particle diameter of the hydrogel polymer may be defined as a longest distance among linear distances connecting any two points on a surface in a single particle of the hydrogel polymer after gel-pulverization.

The pulverizer used for the gel-pulverization is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

Further, the gel-pulverization may be performed multiple times depending on the particle diameter to improve the efficiency of gel-pulverization. For example, the hydrogel polymer may be first pulverized to a particle diameter of 10 mm or less, and further pulverized to a smaller particle diameter.

After the gel-pulverization, the hydrogel polymer may be dried at 100° C. or higher. More specifically, the drying process may be performed at a temperature of 100° C. or higher, 100 to 250° C., or 150 to 200° C. When the drying temperature is too low, the drying time may become excessively long. When the drying temperature is too high, the surface of the polymer is excessively dried to generate fine powders, and physical properties of the super absorbent polymer finally prepared may decrease. Furthermore, the drying time may be 20 minutes to 15 hours in consideration of process efficiency, but it is not limited thereto.

The drying method in the drying step is not particularly limited if it has been generally used in the drying process. Specifically, the drying step may be carried out by the method of hot air provision, infrared radiation, microwave radiation, UV ray radiation, and the like. The moisture content of the polymer after the drying step may be 0.05 to 10 wt %.

Subsequently, a step of (finely) pulverizing the dried polymer obtained from the drying step is carried out.

The polymer powder obtained after the pulverization step may have a particle diameter of 150 to 850 μm. In order to pulverize the polymer into such diameter, a ball mill, a hammer mill, a screw mill, a roll mill, a disc mill, or a jog mill may be used as the pulverizer, but it is not limited thereto.

In addition, in order to manage physical properties of the super absorbent polymer to be finally prepared, the polymer particles obtained from the pulverization step may be subjected to a step of selectively classifying particles having a particle diameter of 150 to 850 μm. The classification step may be performed using a standard sieve, according to the general classifying method of a super absorbent polymer.

After the above-described classification step, a step of cross-linking a surface of the base resin powder may be performed. Specifically, a super absorbent polymer may be prepared by heat-treating the base resin powder in the presence of a surface cross-linking solution containing a surface cross-linking agent to perform surface cross-linking.

Herein, the type of the surface cross-linking agent contained in the surface cross-linking solution is not particularly limited. For example, the surface cross-linking agent may be at least one compound selected from the group consisting of ethyleneglycol diglycidylether, polyethyleneglycol diglycidyl ether, glycerol polyglycidyl ether, propyleneglycol diglycidyl ether, polypropyleneglycol diglycidyl ether, ethylene carbonate, propylene carbonate, butylene carbonate, trimethylene carbonate, glycerol carbonate, ethyleneglycol, diethyleneglycol, propyleneglycol, triethylene glycol, tetraethylene glycol, propanediol, dipropyleneglycol, polypropyleneglycol, glycerin, polyglycerin, butanediol, heptanediol, hexanediol trimethylolpropane, pentaerythritol, sorbitol, calcium hydroxide, magnesium hydroxide, aluminum hydroxide, iron hydroxide, calcium chloride, magnesium chloride, aluminum chloride, and iron chloride.

The content of the surface cross-linking agent may be appropriately selected depending on the kind of the surface cross-linking agent or the reaction conditions. Preferably, the surface cross-linking agent may be used in an amount of 0.001 to 5 parts by weight based on 100 parts by weight of the base resin powder. When the content of the surface cross-linking agent is excessively low, the degree of surface cross-linking is lowered, and physical properties of a super absorbent polymer such as liquid permeability or absorbency under pressure may be deteriorated. Conversely, when the content of the surface cross-linking agent is excessively high, basic absorption properties of the super absorbent polymer may be lowered due to the excessive surface cross-linking reaction, which is not preferable.

In addition, the surface cross-linking solution may further include at least one solvent selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide. The solvent may be included in 0.5 to 10 parts by weight based on 100 parts by weight of the base resin.

In addition, the surface cross-linking solution may further include a thickener. When the surface of the base resin powder is further cross-linked in the presence of a thickener, deterioration in physical properties may be minimized even after the pulverization. Specifically, the thickener may be one or more selected from polysaccharides and polymers containing hydroxyl groups. More specifically, examples of the polysaccharides include gum-based thickeners and cellulose-based thickeners. Examples of the gum-based thickener include xanthan gum, arabic gum, karaya gum, tragacanth gum, ghatti gum, guar gum, locust bean gum and *psyllium* seed gum, and examples of the cellulose-based thickener include hydroxypropylmethylcellulose, carboxymethylcellulose, methylcellulose, hydroxymethylcellulose, hydroxyethylcellulose, hydroxypropylcellulose, hydroxyethylmethylcellulose, hydroxymethylpropylcellulose, hydroxyethylhydroxypropylcellulose, ethylhydroxyethylcellulose, and methylhydroxypropylcellulose. Examples of the polymers containing hydroxyl groups include polyethylene glycol and polyvinyl alcohol.

Meanwhile, in order to perform the surface cross-linking, a method of adding and mixing the surface cross-linking solution and the base resin powder in a reactor, a method of spraying the surface cross-linking solution onto the base resin powder, or a method of mixing the base resin powder and the surface cross-linking solution while continuously providing them to a mixer that is continuously operated may be used.

In addition, the surface cross-linking may be performed at a temperature of 100 to 250° C., and may be continuously performed after the drying and pulverization steps performed at a relatively high temperature. The surface cross-linking reaction may be performed for 1 to 120 minutes, 1 to 100 minutes, or 10 to 60 minutes. That is, the surface cross-linking reaction may be performed under the above-described conditions in order to prevent physical properties of the polymer particles from deteriorating by reducing the damage of the polymer particles due to excessive reaction, while inducing a minimal surface cross-linking reaction.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present disclosure is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

Meanwhile, after the surface cross-linking is performed by the above-described method, a monovalent to trivalent metal cation may be added to the surface cross-linked base resin powder at a temperature of 25° C. to 80° C. As already described above, as the subsequent aging step proceeds after adding the metal cation under predetermined conditions, a number of ionic functional groups in which a hydrogen of a carboxyl group (—COOH) is deprotonated are formed on the surface of the super absorbent polymer to be finally prepared. Therefore, absorption performance such as water retention capacity and absorbency under pressure of the super absorbent polymer can be further improved.

Further, as the metal cation addition step and the aging step are performed at an appropriate temperature, additional surface cross-linking may be suppressed, thereby minimizing the degradation in absorption performance while maintaining excellent gel strength and liquid permeability achieved in the previous surface cross-linking step.

The temperature at the time of addition of the metal cation may be defined as a surface temperature of the super absorbent polymer measured in this addition step. As the metal cation is added at the surface temperature of 25° C. to 80° C., 40° C. to 80° C., or 40° C. to 70° C., the ionic functional groups on the surface of the super absorbent polymer are formed at an appropriate level to further improve absorption performance, and it is possible to suppress the occurrence of additional surface cross-linking, thereby minimizing the degradation in absorption performance.

As the metal cation, any monovalent to trivalent metal cation capable of appropriately deprotonating a carboxyl group can be applied without particular limitation. Specific examples thereof include at least one selected from the group consisting of Na+, K+, Li+, $Zn^{2+}$, $Mg^{2+}$, $Ca^{2+}$, and $Al^{3+}$.

In addition, the step of adding the metal cation may be performed by spraying an aqueous solution containing the metal cation onto the surface cross-linked base resin powder (first method), or by dry-mixing a salt of the metal cation in the solid state with the surface cross-linked base resin powder and adding water (second method).

The aqueous solution containing the metal cation applied in the first method may be an aqueous solution in which at least one metal cation-containing compound selected from the group consisting of oxides, hydroxides, acetates, carbonates, sulfates and halogen salts of the metal cation is dissolved in an aqueous medium. In addition, in the second method, at least one salt compound selected from the group consisting of oxides, hydroxides, acetates, carbonates, sulfates and halogen salts of the metal cation may be applied as the salt of the metal cation. After dry-mixing the salt of the metal cation, water may be added.

In the first or second method, the metal cation-containing compound or the salt of the metal cation may be added in an amount of 0.1 to 3 parts by weight, 0.5 to 2 parts by weight, or 1.0 to 1.8 parts by weight based on 100 parts by weight of the surface cross-linked base resin powder. As the amount of the metal cation added to the super absorbent polymer is optimized, absorption performance of the super absorbent polymer may be further improved while reducing the degradation in other physical properties such as liquid permeability.

After the metal cation is added by the above-described method, the resulting cation-added product is maintained and aged at a temperature of 40° C. to 60° C., or 40° C. to 50° C. for 10 to 30 minutes, or 15 to 30 minutes to prepare a super absorbent polymer. By performing the aging step, an appropriate level of ionic functional groups can be formed on the surface of the super absorbent polymer, whereby absorption performance of the super absorbent polymer can be further improved. Conversely, when the aging temperature is too high or the aging time is too long, the absorption performance may be rather deteriorated due to the progress of additional surface cross-linking.

The super absorbent polymer formed by the above-described method may exhibit improved absorption performance due to the progress of the metal cation addition step and the aging step described above. This improvement in absorption performance can be defined by a difference between an absorbency measured immediately before the metal cation addition step and an absorbency of the super absorbent polymer finally formed through the aging step.

Accordingly, the super absorbent polymer may be characterized in that an absorbency of Equation 1 measured immediately before the metal cation addition step (for example, between the surface cross-linking step and the metal cation addition step) is increased by 0.2 to 3 g/g, 0.3 to 2.5 g/g, or 0.4 to 2.3 g/g than the absorbency measured after the aging step, which results in better absorption performance:

$$\text{Absorbency} = \text{CRC} + \text{AUP} \qquad \text{[Equation 1]}$$

in Equation 1,

CRC is centrifuge retention capacity to saline (0.9 wt % aqueous solution of sodium chloride) for 30 min, and AUP is absorbency under pressure to saline (0.9 wt % aqueous solution of sodium chloride) at 0.7 psi for 1 hour.

In addition, the super absorbent polymer may have a moisture content of 0.8 to 1.5 wt %, or 0.85 to 1.4 wt % after the aging step, which is suitable for sanitary products such as diapers.

The super absorbent polymer obtained according to the above-described method may exhibit further improved absorption performance such as water retention capacity and absorbency under pressure, while exhibiting excellent gel strength and liquid permeability achieved in the surface cross-linking step. As a result, the super absorbent polymer can be suitably used in sanitary materials such as diapers, in particular, ultra-thin sanitary materials having a reduced pulp content.

Advantageous Effects

The super absorbent polymer according to the present disclosure can exhibit further improved absorption performance such as water retention capacity and absorbency under pressure while having high gel strength and liquid permeability, and thus, it can be preferably applied to sanitary materials such as diapers having a thinner thickness.

DETAILED DESCRIPTION OF THE EMBODIMENTS

Hereinafter, the present invention will be described in more detail with reference to examples. However, these examples are for illustrative purposes only, and the invention is not intended to be limited by these examples.

Example 1

After adding 500 g of acrylic acid, 3 g of polyethyleneglycol diacrylate and 0.04 g of diphenyl(2,4,6-trimethylbenzoyl)-phosphine oxide to a 3 L glass container equipped with a stirrer, a nitrogen injector, and a thermometer to dissolve, 896.4 g of 24.5 wt % sodium hydroxide solution was added thereto to prepare a water-soluble unsaturated monomer aqueous solution while continuously introducing nitrogen. The water-soluble unsaturated monomer aqueous solution was cooled to 45° C. 500 g of this aqueous solution was added to a stainless steel container having a width of 250 mm, a length of 250 mm, and a height of 30 mm. Then, UV polymerization was performed for 60 seconds by irradiating ultraviolet rays (irradiation amount: 10 mV/cm$^2$) to prepare a hydrogel polymer. After pulverizing the obtained hydrogel polymer to a size of 2 mm*2 mm, the moisture content was measured to be 40.1%.

The obtained gel-type resin was spread on a stainless wire gauze having a pore size of 600 μm to a thickness of about 30 mm and dried in a 180° C. hot air oven for 30 minutes. The dried polymer thus obtained was pulverized using a pulverizer, and classified using an ASTM standard mesh to obtain a base resin powder having a particle diameter of 150 to 850 μm.

1 parts by weight of ethylene carbonate, 4 parts by weight of water, and 0.02 parts by weight of silica were sprayed onto 100 parts by weight of the base resin powder for mixing, and placed in a container equipped with a stirrer and a double jacket to perform a surface cross-linking reaction at 185° C. for 60 minutes. Thereafter, the surface-treated powder was classified using an ASTM standard mesh to obtain a super absorbent polymer powder having a particle diameter of 150 to 850 μm.

After the surface cross-linking was performed by the above-described method, 1.5 parts by weight of an aqueous solution in which 5 wt % sodium hydroxide was dissolved was added to 100 parts by weight of the surface cross-linked resin powder by spraying. Upon this addition, a temperature of the surface of the surface cross-linked base resin powder was adjusted to 25° C.

Thereafter, a super absorbent polymer of Example 1 was prepared by aging/maintaining at a temperature of 50° C. for 15 minutes.

Example 2

Up to the surface cross-linking, the same method as in Example 1 was applied.

1.5 parts by weight of an aqueous solution in which 5 wt % sodium hydroxide was dissolved was added to 100 parts by weight of the surface-crosslinked resin powder by spraying. Upon this addition, a temperature of the surface of the surface cross-linked base resin powder was adjusted to 25° C.

Thereafter, a super absorbent polymer of Example 2 was prepared by aging/maintaining at a temperature of 50° C. for 25 minutes.

Example 3

Up to the surface cross-linking, the same method as in Example 1 was applied.

1.5 parts by weight of an aqueous solution in which 5 wt % sodium hydroxide was dissolved was added to 100 parts by weight of the surface-crosslinked resin powder by spraying. Upon this addition, a temperature of the surface of the surface cross-linked base resin powder was adjusted to 40° C.

Thereafter, a super absorbent polymer of Example 3 was prepared by aging/maintaining at a temperature of 50° C. for 15 minutes.

Example 4

Up to the surface cross-linking, the same method as in Example 1 was applied.

1.5 parts by weight of an aqueous solution in which 5 wt % sodium hydroxide was dissolved was added to 100 parts by weight of the surface-crosslinked resin powder by spraying. Upon this addition, a temperature of the surface of the surface cross-linked base resin powder was adjusted to 40° C.

Thereafter, a super absorbent polymer of Example 4 was prepared by aging/maintaining at a temperature of 50° C. for 25 minutes.

Example 5

Up to the surface cross-linking, the same method as in Example 1 was applied.

1.5 parts by weight of an aqueous solution in which 5 wt % sodium hydroxide was dissolved was added to 100 parts by weight of the surface-crosslinked resin powder by spraying. Upon this addition, a temperature of the surface of the surface cross-linked base resin powder was adjusted to 70° C.

Thereafter, a super absorbent polymer of Example 5 was prepared by aging/maintaining at a temperature of 50° C. for 15 minutes.

Comparative Example 1

Up to the surface cross-linking, the same method as in Example 1 was applied.

1.5 parts by weight of an aqueous solution in which 5 wt % sodium hydroxide was dissolved was added to 100 parts by weight of the surface-crosslinked resin powder by spraying. Upon this addition, a temperature of the surface of the surface cross-linked base resin powder was adjusted to 140° C.

Thereafter, a super absorbent polymer of Comparative Example 1 was prepared by aging/maintaining at a temperature of 50° C. for 15 minutes.

Comparative Example 2

Up to the surface cross-linking, the same method as in Example 1 was applied.

1.5 parts by weight of an aqueous solution in which 5 wt % sodium hydroxide was dissolved was added to 100 parts by weight of the surface-crosslinked resin powder by spraying. Upon this addition, a temperature of the surface of the surface cross-linked base resin powder was adjusted to 140° C.

Thereafter, a super absorbent polymer of Comparative Example 2 was prepared by aging/maintaining at a temperature of 50° C. for 25 minutes.

Comparative Example 3

Up to the surface cross-linking, the same method as in Example 1 was applied.

1.5 parts by weight of an aqueous solution in which 5 wt % sodium hydroxide was dissolved was added to 100 parts by weight of the surface-crosslinked resin powder by spraying. Upon this addition, a temperature of the surface of the surface cross-linked base resin powder was adjusted to 100° C.

Thereafter, a super absorbent polymer of Comparative Example 3 was prepared by aging/maintaining at a temperature of 50° C. for 15 minutes.

Comparative Example 4

Up to the surface cross-linking, the same method as in Example 1 was applied.

1.5 parts by weight of an aqueous solution in which 5 wt % sodium hydroxide was dissolved was added to 100 parts by weight of the surface-crosslinked resin powder by spraying. Upon this addition, a temperature of the surface of the surface cross-linked base resin powder was adjusted to 40° C.

Thereafter, a super absorbent polymer of Comparative Example 4 was prepared by aging/maintaining at a temperature of 60° C. for 45 minutes.

Example 6

Up to the surface cross-linking, the same method as in Example 1 was applied.

1.5 parts by weight of an aqueous solution in which 15 wt % sodium carbonate was dissolved was added to 100 parts by weight of the surface-crosslinked resin powder by spraying. Upon this addition, a temperature of the surface of the surface cross-linked base resin powder was adjusted to 25° C.

Thereafter, a super absorbent polymer of Example 6 was prepared by aging/maintaining at a temperature of 40° C. for 30 minutes.

Example 7

Up to the surface cross-linking, the same method as in Example 1 was applied.

1.5 parts by weight of an aqueous solution in which 15 wt % sodium carbonate was dissolved was added to 100 parts by weight of the surface-crosslinked resin powder by spraying. Upon this addition, a temperature of the surface of the surface cross-linked base resin powder was adjusted to 80° C.

Thereafter, a super absorbent polymer of Example 7 was prepared by aging/maintaining at a temperature of 40° C. for 30 minutes.

Example 8

Up to the surface cross-linking, the same method as in Example 1 was applied.

1.5 parts by weight of an aqueous solution in which 20 wt % zinc acetate was dissolved was added to 100 parts by weight of the surface-crosslinked resin powder by spraying. Upon this addition, a temperature of the surface of the surface cross-linked base resin powder was adjusted to 40° C.

Thereafter, a super absorbent polymer of Example 8 was prepared by aging/maintaining at a temperature of 40° C. for 30 minutes.

Example 9

Up to the surface cross-linking, the same method as in Example 1 was applied.

1.5 parts by weight of an aqueous solution in which 15 wt % magnesium acetate was dissolved was added to 100 parts by weight of the surface-crosslinked resin powder by spraying. Upon this addition, a temperature of the surface of the surface cross-linked base resin powder was adjusted to 40° C.

Thereafter, a super absorbent polymer of Example 9 was prepared by aging/maintaining at a temperature of 40° C. for 30 minutes.

Example 10

Up to the surface cross-linking, the same method as in Example 1 was applied.

1.5 parts by weight of an aqueous solution in which 10 wt % potassium carbonate was dissolved was added to 100 parts by weight of the surface-crosslinked resin powder by spraying. Upon this addition, a temperature of the surface of the surface cross-linked base resin powder was adjusted to 40° C.

Thereafter, a super absorbent polymer of Example 10 was prepared by aging/maintaining at a temperature of 40° C. for 30 minutes.

Example 11

Up to the surface cross-linking, the same method as in Example 1 was applied.

100 parts by weight of the surface cross-linked base resin powder was dry-mixed with 1.5 parts by weight of calcium carbonate powder, and 1.5 parts by weight of water was further mixed. Upon this addition, a temperature of the surface of the surface cross-linked base resin powder was adjusted to 25° C.

Thereafter, a super absorbent polymer of Example 11 was prepared by aging/maintaining at a temperature of 40° C. for 30 minutes.

Experimental Examples

The physical properties of each super absorbent polymer prepared in Examples and Comparative Examples were measured and evaluated in the following manner.

(1) Moisture Content

The super absorbent polymer was heated at 140° C. for 10 minutes. The weight of the super absorbent polymer was measured before and after heating, respectively, and the moisture content was calculated according to the following formula: "Moisture content (wt %)=(weight of super absorbent polymer before heating−weight of super absorbent polymer after heating)/weight of super absorbent polymer before heating*100"

(2) Centrifuge Retention Capacity (CRC)

The centrifuge retention capacity (CRC) by absorption ratio under a non-loading condition was measured according to the EDANA (European Disposables and Nonwovens Association) WSP 241.3 method. After inserting $W_0$ (g, about 0.2 g) of the super absorbent polymer uniformly in a nonwoven fabric envelope and sealing the same, it was soaked in saline (0.9 wt % aqueous solution of sodium chloride) at room temperature. After 30 min, the envelope was centrifuged at 250 G for 3 minutes to drain, and the weight $W_2$ (g) of the envelope was measured. Further, after carrying out the same operation without using the super absorbent polymer, the weight $W_1$ (g) of the envelope was measured. Then, CRC (g/g) was calculated by using the obtained weight values according to the following Formula 1, and the water retention capacity was confirmed.

$$CRC(g/g) = \{[W_2(g) - W_1(g) - W_0(g)]/W_0(g)\} \quad \text{[Formula 1]}$$

(3) Absorbency Under Pressure (AUP)

The absorbency under pressure (AUP) of each super absorbent polymer prepared in Examples and Comparative Examples was measured according to the EDANA (European Disposables and Nonwovens Association) WSP 242.3 method.

First, a 400 mesh stainless steel screen was installed in a cylindrical bottom of a plastic having an inner diameter of 60 mm. $W_0$ (g, 0.90 g) of the polymer prepared in each of Examples 1 to 6 and Comparative Examples 1 to 4 was uniformly scattered on the screen at a temperature of 23±2 t and a relative humidity of 45%. Thereafter, a piston which can uniformly provide a load of 4.83 kPa (0.7 psi) was placed on the polymer. Herein, the outer diameter of the piston was slightly smaller than 60 mm, there was no gap with the inner wall of the cylinder, and jig-jog of the cylinder was not interrupted. At this time, the weight $W_3$ (g) of the device was measured.

Subsequently, a glass filter having a diameter of 125 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. After the measuring device was mounted on the glass filter, the liquid was absorbed for 1 hour under a load. After 1 hour, the measuring device was lifted, and the weight $W_4$ (g) was measured.

Then, AUP (g/g) was calculated by using the obtained weight values according to the following Formula 2.

$$AUP(g/g) = [W_4(g) - W_3(g)]/W_0(g) \quad \text{[Formula 2]}$$

In Formula 2, $W_0$ (g) is an initial weight (g) of the super absorbent polymer, $W_3$ (g) is a sum of a weight of the super absorbent polymer and a weight of the device providing a load to the polymer, and $W_4$ (g) is a sum of a weight of the super absorbent polymer and a weight of the device providing a load to the polymer, after making the super absorbent polymer absorb the saline for one hour under a load (0.7 psi).

(4) Difference in Absorbency

The above-described centrifuge retention capacity and absorbency under pressure were first measured between the surface cross-linking and adding the metal cation, and then measured again after the aging step. Then, the absorbency was calculated by Equation 1 below from the centrifuge retention capacity and absorbency under pressure measured first and second, respectively, and a difference between the second measured absorbency and the first measured absorbency was obtained:

$$\text{Absorbency} = CRC + AUP \quad \text{[Equation 1]}$$

in Equation 1,

CRC is centrifuge retention capacity to saline (0.9 wt % aqueous solution of sodium chloride) for 30 min, and AUP is absorbency under pressure to saline (0.9 wt % aqueous solution of sodium chloride) at 0.7 psi for 1 hour.

The physical properties of Examples 1 to 11 and Comparative Examples 1 to 4 measured according to the above methods are summarized in Table 1 below.

TABLE 1

| | Moisture content (wt %) | Difference in absorbency (g/g) |
|---|---|---|
| Example 1 | 1.11 | 0.7 |
| Example 2 | 0.98 | 0.4 |
| Example 3 | 1.09 | 1.0 |
| Example 4 | 0 | 1.0 |
| Example 5 | 0.85 | 0.4 |
| Comparative Example 1 | 0.62 | −0.2 |
| Comparative Example 2 | 0 | 0 |
| Comparative Example 3 | 0.65 | −0.2 |
| Comparative Example 4 | 0.46 | −0.2 |
| Example 6 | 1.05 | 0.3 |
| Example 7 | 1.13 | 2.1 |
| Example 8 | 1.21 | 0.4 |
| Example 9 | 1.32 | 0.5 |

TABLE 1-continued

|  | Moisture content (wt %) | Difference in absorbency (g/g) |
|---|---|---|
| Example 10 | 1.09 | 0.5 |
| Example 11 | 0.98 | 0.6 |

Referring to Table 1, the improvement in absorbency after the metal cation addition step and the aging step was clearly confirmed in Examples 1 to 11. On the other hand, there was no improvement in absorbency, or rather, there was a decrease in absorbency in Comparative Examples 1 to 4 despite the addition of the metal cation, since the temperature at the time of addition was too high or the aging conditions were out of the preferred range.

The invention claimed is:

1. A preparation method of a super absorbent polymer, comprising:
forming a hydrogel polymer by cross-linking and polymerizing a water-soluble ethylene-based unsaturated monomer having at least partially neutralized acidic groups in the presence of an internal cross-linking agent;
drying, pulverizing and classifying the hydrogel polymer to form a base resin powder; forming a surface cross-linked layer by further cross-linking a surface of the base resin powder in the presence of a surface cross-linking agent,
adding a monovalent to trivalent metal cation on the surface cross-linked base resin powder at a temperature of 25° C. to 80° C., and
maintaining and aging a resulting metal cation-added product at a temperature of 40° C. to 60° C. for 10 to 30 minutes,
wherein an absorbency of the super absorbent polymer measured after the aging is increased by 0.2 to 3 g/g with respect to the absorbency measured immediately before the metal cation addition,
wherein the absorbency is defined by Equation 1:

Absorbency=CRC+AUP    [Equation 1]

in Equation 1, CRC is centrifuge retention capacity to saline for 30 min, and AUP is absorbency under pressure to the saline at 0.7 psi for 1 hour,
wherein the saline is a 0.9 wt % aqueous solution of sodium chloride.

2. The preparation method of a super absorbent polymer of claim 1, wherein the water-soluble ethylene-based unsaturated monomer comprises at least one of: an anionic monomer selected from the group consisting of acrylic acid, methacrylic acid, maleic anhydride, fumalic acid, crotonic acid, itaconic acid, 2-acryloylethane sulfonic acid, 2-methacryloylethane sulfonic acid, 2-(meth)acryloylpropane sulfonic acid, 2-(meth)acrylamide-2-methyl propane sulfonic acid, and a salt thereof; a nonionic hydrophilic monomer selected from the group consisting of (meth)acrylamide, N-substituted (meth)acrylate, 2-hydroxyethyl(meth)acrylate, 2-hydroxypropyl(meth)acrylate, methoxypolyethyleneglycol(meth)acrylate, and polyethyleneglycol(meth)acrylate; or an amino-containing unsaturated monomer of (N,N)-dimethylaminoethyl(meth)acrylate (N,N)-dimethylaminopropyl(meth)acrylamid, and a quaternary compound thereof.

3. The preparation method of a super absorbent polymer of claim 1, wherein the internal cross-linking agent comprises at least one of N,N'-methylenebisacrylamide, trimethylolpropane tri(meth)acrylate, ethyleneglycol di(meth)acrylate, polyethyleneglycol di(meth)acrylate, propyleneglycol di(meth)acrylate, polypropyleneglycol (meth)acrylate, butanediol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, propylene glycol, or glycerin.

4. The preparation method of a super absorbent polymer of claim 1, wherein the classified base resin powder has a particle diameter of 150 to 850 μm.

5. The preparation method of a super absorbent polymer of claim 1, wherein the surface cross-linking agent comprises at least one of ethyleneglycol diglycidylether, polyethyleneglycol diglycidylether, glycerol polyglycidyl ether, propyleneglycol diglycidyl ether, polypropyleneglycol diglycidyl ether, ethylene carbonate, propylene carbonate, butylene carbonate, trimethylene carbonate, glycerol carbonate, ethyleneglycol, diethyleneglycol, propyleneglycol, triethylene glycol, tetraethylene glycol, propanediol, dipropyleneglycol, polypropyleneglycol, glycerin, polyglycerin, butanediol, heptanediol, hexanediol trimethylolpropane, pentaerythritol, sorbitol, calcium hydroxide, magnesium hydroxide, aluminum hydroxide, iron hydroxide, calcium chloride, magnesium chloride, aluminum chloride, or iron chloride.

6. The preparation method of a super absorbent polymer of claim 1, wherein the metal cation comprises at least one of Na+, K+, Li+, $Zn^{2+}$, $mg^{2+}$, $Ca^{2+}$, and $Al^{3+}$.

7. The preparation method of a super absorbent polymer of claim 1, wherein the metal cation addition is performed by spraying an aqueous solution containing the metal cation onto the surface cross-linked base resin powder, or by dry-mixing a salt of the metal cation in solid state with the surface cross-linked base resin powder and adding water.

8. The preparation method of a super absorbent polymer of claim 7, wherein the aqueous solution containing the metal cation is an aqueous solution in which at least one metal cation-containing compound selected from the group consisting of oxides, hydroxides, acetates, carbonates, sulfates and halogen salts of the metal cation is dissolved in an aqueous medium.

9. The preparation method of a super absorbent polymer of claim 7, wherein the salt of the metal cation is at least one salt compound selected from the group consisting of oxides, hydroxides, acetates, carbonates, sulfates and halogen salts of the metal cation.

10. The preparation method of a super absorbent polymer of claim 8, wherein the metal cation-containing compound or the salt of the metal cation is added in an amount of 0.1 to 3 parts by weight based on 100 parts by weight of the surface cross-linked base resin powder.

11. The preparation method of a super absorbent polymer of claim 1, wherein an ionic functional group of —COO— deprotonated by the metal cation is formed on a surface of the super absorbent polymer.

12. The preparation method of a super absorbent polymer of claim 1, wherein the super absorbent polymer has a moisture content of 0.8 to 1.5 wt % after the aging.

* * * * *